L. A. MATOS.
BALANCE.

No. 78,532.                               Patented June 2, 1868.

Witnesses
Francis D. Pastorius
John Lille

Inventor.
Louis A. Matos.

United States Patent Office.

LOUIS A. MATOS, OF PHILADELPHIA, PENNSYLVANIA.

Letters Patent No. 78,582, dated June 2, 1868.

IMPROVEMENT IN BALANCES.

The Schedule referred to in these Letters Patent and making part of the same.

TO ALL WHOM IT MAY CONCERN:

Be it known that I, LOUIS A. MATOS, of the city of Philadelphia, and State of Pennsylvania, have invented an Improvement in Scales or Balances; and I do hereby declare that the following is a full, clear, and exact description of the same, reference being had to the accompanying drawing, and to the letters of reference marked thereon, making part of this specification, in which—

Similar letters refer to similar parts in the two views.

Figure 1:
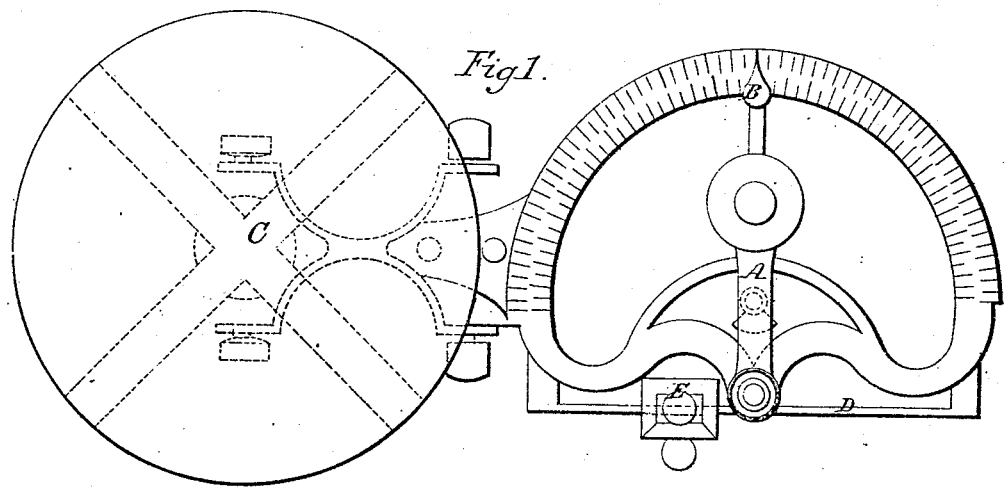
Figure 1 is a plan view.
Figure 2:
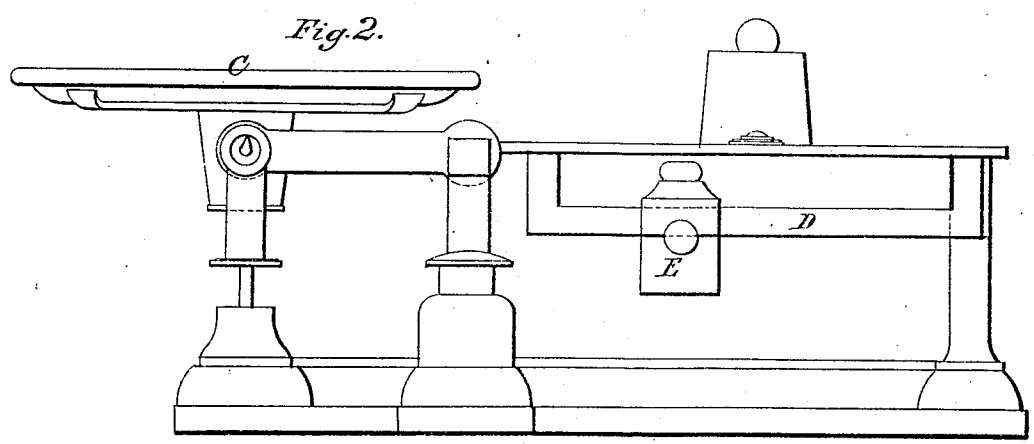
Figure 2 is a side elevation.

On the seventh day of July, eighteen hundred and sixty-three, Letters Patent of the United States were granted to Sandy Harris, of Philadelphia, Pennsylvania, and numbered 89,145, for an improvement in balances. The invention consists in substituting for the ordinary scale balance-beam a graduated arc, with a single weight suspended on an arm, which is pivoted to the chord of the arc, and which has a vibrating motion, carrying the weight, and an index-finger attached around the inside of the graduated arc.

I have discovered, in my business of druggist, that the aforesaid scale or balance weighs against the buyer. For an example, in selling fluids, the index-finger A B is first moved to that part of the vernier or graduated arc indicating the weight called for. The vial or other receptacle for containing the fluid is then placed in the pan C, and the fluid poured into it until the scale balances. Now, it is readily seen that the buyer does not get the quantity of fluid indicated by the index-finger A B, but is deficient in quantity equal to the weight of the vial. To correct this inaccuracy, I fix a horizontal bar, D, to the side, and on the vernier-end of the scale, a sliding weight, E, takes on this bar D.

To operate my improvement, first place the vial or other receptacle to contain the fluid in the pan C. Then adjust the weight E on the bar D until the scale is in equilibrium. Place the index-finger at that part of the vernier indicating the weight required, and pour the fluid into the vial until the scale is again in equilibrium.

The improvement herein shown is especially adapted to the above-mentioned scales, and makes them the most accurate that can be had for ascertaining the exact weight.

What I claim as my invention, and desire to secure by Letters Patent, is—

The adjusting or sliding balance-weight E, in combination with the vernier or graduated arc, and the vibrating weight, which is suspended on an arm which is pivoted to the chord of the arc, substantially as shown and described.

In testimony whereof, I hereunto sign my name to this specification in presence of two subscribing witnesses.

LOUIS A. MATOS.

Witnesses:
 FRANCIS D. PASTORIUS,
 W. W. DOUGHERTY.